United States Patent [19]
Brooks

[11] Patent Number: 5,461,971
[45] Date of Patent: Oct. 31, 1995

[54] UNION PEELING DEVICE

[76] Inventor: Cecil B. Brooks, 5118 Gainesville Dr., Tampa, Fla. 33617

[21] Appl. No.: 393,434

[22] Filed: Feb. 23, 1995

[51] Int. Cl.$^6$ .......................... A47J 17/00; A47G 19/00; A23L 1/00

[52] U.S. Cl. .................. 99/645; 30/1; 30/123.5; 99/541; 99/588; 241/169.1; 312/1; 312/284

[58] Field of Search .............. 99/537, 538–541, 99/584, 588, 645; 426/132; 83/570, 594, 595; 241/169.1, 190, 243; 312/1, 284; 30/1, 122, 123.5, 123.6, 123.7

[56] References Cited

U.S. PATENT DOCUMENTS

| | | | |
|---|---|---|---|
| 262,512 | 8/1882 | Toutant | 312/284 |
| 1,929,139 | 10/1933 | Eisenhauer | 312/284 |
| 1,988,717 | 1/1935 | Caldwell | 99/645 |
| 3,020,113 | 2/1962 | Molitor | 312/284 |
| 3,043,207 | 7/1962 | Janus | 99/645 |
| 3,421,706 | 3/1966 | Monaco et al. | 312/284 |
| 3,534,794 | 10/1970 | Schilbred | 241/169.1 |
| 3,734,003 | 5/1973 | Gerson | 99/588 |
| 3,890,450 | 6/1975 | Orenstein | 99/645 |
| 3,949,637 | 4/1976 | Funke, nee Honsel | 241/169.1 |
| 4,060,293 | 11/1977 | Waiters | 312/284 |
| 5,311,813 | 5/1994 | Fairbanks et al. | 99/645 |

*Primary Examiner*—Timothy F. Simone

[57] ABSTRACT

An onion peeling device comprised of a shield having an open lower end and a rounded upper end. The open lower end has a slot formed therein extending upwardly therefrom. The slot has an upper portion and a lower portion. The upper portion has a width greater than the lower portion. The slot forms edges on opposing sides thereof. The shield is adapted to receive an onion within the open lower end thereof. The shield serves to protect a user's eyes from juices produced when slicing the onion. A rubber strip is secured to the edges of the slot of the shield. The rubber strip is adapted to secure a knife blade within the slot to be used on an onion within the shield.

4 Claims, 3 Drawing Sheets

UNION PEELING DEVICE

BACKGROUND OF THE INVENTION

1. Field of the Invention

The present invention relates to an onion peeling device and more particularly pertains to enabling a user to effectively peel and slice an onion without disturbance to his/her eyes with an onion peeling device.

2. Description of the Prior Art

The use of vegetable cutting devices is known in the prior art. More specifically, vegetable cutting devices heretofore devised and utilized for the purpose of cutting vegetables, such as onions, in a variety of sizes and shapes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,142,973 to Tur et al. discloses an onion cutter for cutting food prior to cooking.

U.S. Pat. No. 4,704,959 to Scallen discloses an apparatus for cutting potatoes and onions.

U.S. Pat. No. 3,949,637 to Funke, nee Honsel discloses an onion slicer which will permit for instance one or more onions to be sliced into pieces of suitable sizes.

U.S. Pat. No. 3,734,003 to Gerson discloses an onion peeler designed for the removal of the onions skin.

U.S. Pat. No. 3,534,794 to Schilbred discloses an apparatus for slicing or cutting of fruit and vegetables, especially onions.

While these devices fulfill their respective, particular objective and requirements, the aforementioned patents do not describe an onion peeling device for enabling a user to effectively peel and slice an onion without disturbance to his/her eyes.

In this respect, the onion peeling device according to the present invention substantially departs from the conventional concepts and designs of the prior art, and in doing so provides an apparatus primarily developed for the purpose of enabling a user to effectively peel and slice an onion without disturbance to his/her eyes.

Therefore, it can be appreciated that there exists a continuing need for new and improved onion peeling device which can be used for enabling a user to effectively peel and slice an onion without disturbance to his/her eyes. In this regard, the present invention substantially fulfills this need.

SUMMARY OF THE INVENTION

In the view of the foregoing disadvantages inherent in the known types of vegetable cutting devices now present in the prior art, the present invention provides an improved onion peeling device. As such, the general purpose of the present invention, which will be described subsequently in greater detail, is to provide a new and improved onion peeling device and method which has all the advantages of the prior art and none of the disadvantages.

To attain this, the present invention essentially comprises a shield having a generally circular configuration. The shield has an open lower end and a rounded upper end. The open lower end has a first peripheral portion and a second peripheral portion. The first peripheral portion is situated above the second peripheral portion. The first peripheral portion is separated from the second peripheral portion by a vertical step portion. The vertical step portion has an upper end and a lower end. The upper end is integral with the first peripheral portion. The lower end is integral with the second peripheral portion. The shield has a slot formed therein extending upwardly from the vertical step portion. The slot has an upper portion and a lower portion. The upper portion has a width greater than the lower portion. The slot forms edges on opposing sides thereof. The shield is adapted to receive an onion within the open lower end thereof. The shield serves to protect a user's eyes from juices produced when slicing the onion. A rubber strip is secured to the edges of the slot of the shield. The rubber strip is adapted to secure a knife blade within the slot to be used on an onion within the shield. The device contains a knife having a blade portion adapted to be received within the slot and the rubber strip of the shield. The knife functions to slice the onion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved onion peeling device which has all the advantages of the prior art vegetable cutting devices and none of the disadvantages.

It is another object of the present invention to provide a new and improved onion peeling device which may be easily and efficiently manufactured and marketed.

It is a further object of the present invention to provide a new and improved onion peeling device which is of durable and reliable construction.

An even further object of the present invention is to provide a new and improved onion peeling device which is susceptible of a low cost of manufacture with regard to both materials and labor, and which accordingly is then susceptible of low prices of sale to the consuming public, thereby making such an onion peeling device economically available to the buying public.

Still yet another object of the present invention is to provide a new and improved onion peeling device which provides in the apparatuses and methods of the prior art some of the advantages thereof, while simultaneously overcoming some of the disadvantages normally associated therewith.

Even still another object of the present invention is to provide a new and improved onion peeling device for enabling a user to effectively peel and slice an onion without disturbance to his/her eyes.

Lastly, it is an object of the present invention to provide a new and improved onion peeling device comprised of a shield having an open lower end and a rounded upper end. The open lower end has a slot formed therein extending upwardly therefrom. The slot has an upper portion and a lower portion. The upper portion has a width greater than the lower portion. The slot forms edges on opposing sides thereof. The shield is adapted to receive an onion within the open lower end thereof. The shield serves to protect a user's eyes from juices produced when slicing the onion. A rubber strip is secured to the edges of the slot of the shield. The rubber strip is adapted to secure a knife blade within the slot to be used on an onion within the shield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
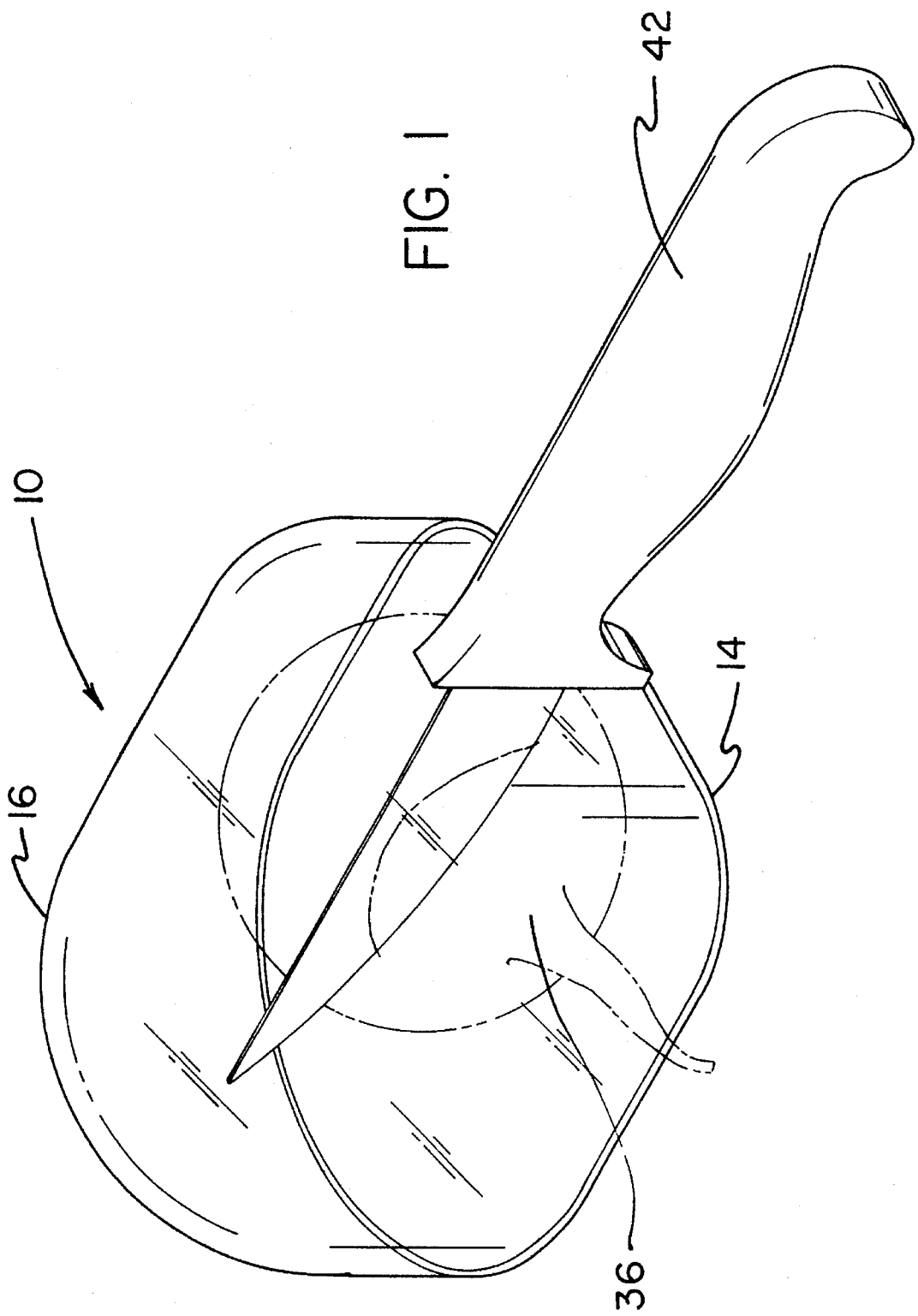
FIG. 1 is a perspective view of the preferred embodiment of the onion peeling device constructed in accordance with the principles of the present invention.

With reference now to the drawings, and in particular, to FIGS. 1–5 thereof, the preferred embodiment of the new and improved onion peeling device embodying the principles and concepts of the present invention and generally designated by the reference number 10 will be described.

Specifically, it will be noted in the various Figures that the device relates to a new and improved onion peeling device for enabling a user to effectively peel and slice an onion without disturbance to his/her eyes. In its broadest context, the device consists of a shield, a rubber strip, and a knife.

The device 10 contains a shield 12 having a generally circular configuration. The shield 12 has an open lower end 14 and a rounded upper end 16. The open lower end 14 has a first peripheral portion 18 and a second peripheral portion 20. The first peripheral portion 18 is situated above the second peripheral portion 20. The first peripheral portion 18 is separated from the second peripheral portion 20 by a vertical step portion 22. The vertical step portion 22 has an upper end 24 and a lower end 26. The upper end 24 is integral with the first peripheral portion 18. The lower end 26 is integral with the second peripheral portion 20. The shield 12 has a slot 28 formed therein extending upwardly from the vertical step portion 26. The slot 28 has an upper portion 30 and a lower portion 32. The upper portion 30 has a width greater than the lower portion 32 see FIG. 4. The slot 28 forms edges 34 on opposing sides thereof. The shield 12 is adapted to receive an onion 36 within the open lower end 14 thereof. The shield 12 serves to protect a user's eyes from juices produced when slicing the onion 36. The user can hold the shield 12 in their hand to slice the onion 36 or it can be used on a table top or cutting board.

Figure 5:
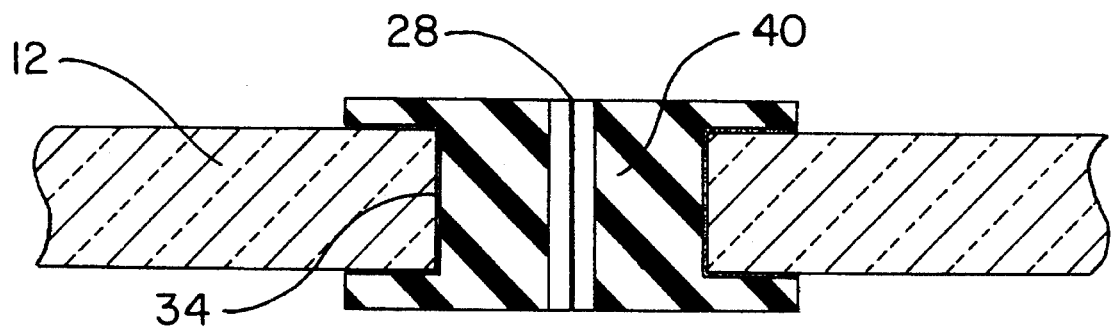
FIG. 5 is a cross-sectional view as taken along line 5—5 of FIG. 4.

A rubber strip 40 is secured to the edges 34 of the slot 28 of the shield 12. The rubber strip 40 is adapted to secure a knife blade within the slot 28 to be used on an onion 36 within the shield 12. The rubber strip 40 protects the knife while also pinching the knife inwardly to prevent it from becoming easily dislodged from the slot 28 and causing injury to the user's hand. As best illustrated by FIG. 5, the rubber strip 40 is constructed with in a U-shape to effectively secure to the edges 34 of the slot 28.

Figures 2, 3:
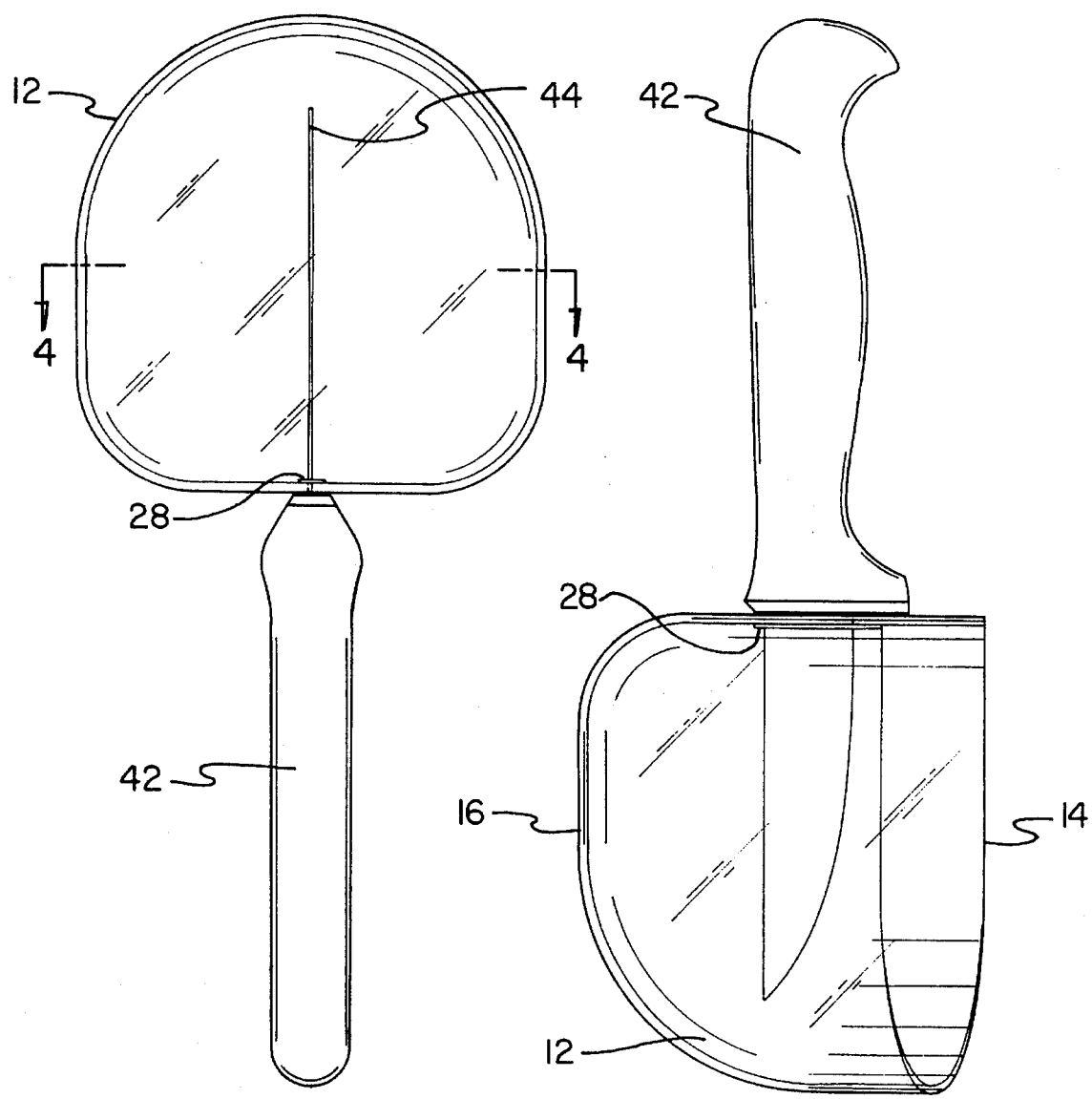
FIG. 2 is a plan view of the preferred embodiment of the present invention.
FIG. 3 is a side elevation view of the present invention.
Figure 4:
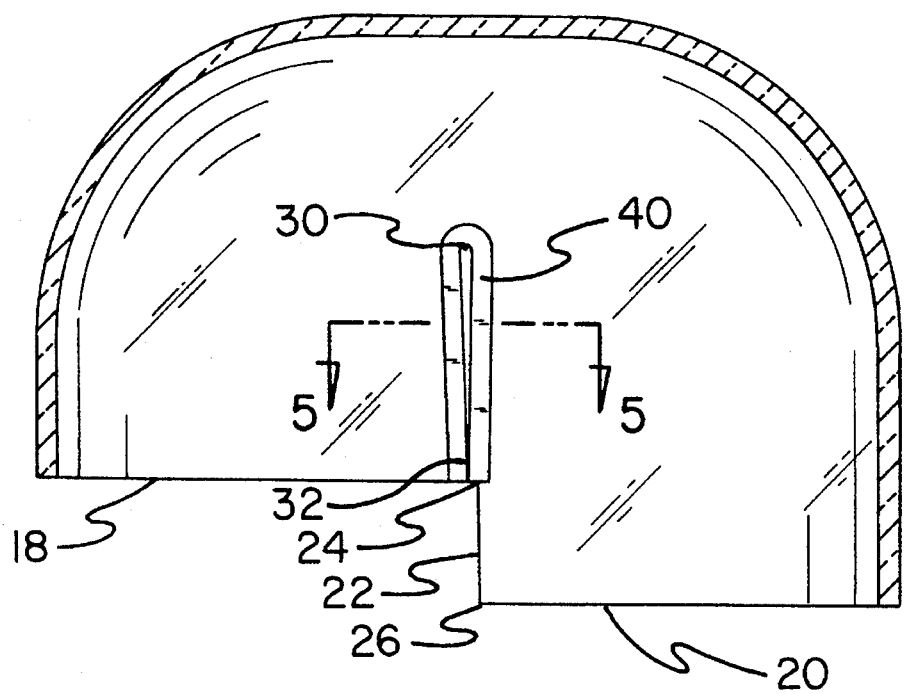
FIG. 4 is a cross-sectional view as taken along line 4—4 of FIG. 2.

As in FIG. 3, the device 10 contains a knife 42 having a blade portion 44 adapted to be received within the slot 28 and the rubber strip 40 of the shield 12. The knife 42 functions to slice the onion 36.

The present invention is a small protective shield 12 and cutting knife 42 which enable the user to effectively peel and slice an onion 36 without disturbance to his/her eyes.

Appropriately sized to accommodate one large onion 36 at a time, this device 10 consists of a dome-shaped shield 12 which is attached around the blade portion 44 of a cutting knife 42, at the location where the blade portion 44 and the handle of the knife meet. This vertical slot 28 through the shield 12 is lined with a thin rubber strip 40, enabling the knife 42 to be securely positioned within the shield 12. Produced from a durable transparent plastic, this device 10 could also be manufactured in various sizes, with a variety of cutting knife 42 styles.

The knife 42 is inserted into the vertical slot 28 so that the blade portion 44 is enclosed within the transparent shield 12. An onion 36 is then placed beneath the shield 12 and rotated within the shield 12 while the knife 12 and protective shield 12 are held in a stationary position. Once the onion 36 is peeled and cut, the shield 12 is lifted upward, exposing the prepared vegetable. Peels are then conveniently discarded into a sink or garbage container, and the onion 36 used as desired. The knife 42 is easily removed from the shield 12, enabling both to be easily cleaned. As necessary, various sized knives 42 may be used in conjunction with this shield 12.

This unique and practical kitchen device 10 eliminates the annoying and sometimes painful eye irritations caused by the vapors emitted during the processing of onions 36.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An onion peeling device for enabling a user to effectively peel and slice an onion without disturbance to his/her eyes comprising, in combination:

a shield having a generally circular configuration, the shield having an open lower end and a rounded upper end, the open lower end having a first peripheral portion and a second peripheral portion, the first peripheral portion situated above the second peripheral portion, the first peripheral portion separated from the second peripheral portion by a vertical step portion, the vertical step portion having an upper end and a lower end, the upper end integral with the first peripheral portion, the lower end integral with the second peripheral portion, the shield having a slot formed therein extending upwardly from the vertical step portion, the slot having an upper portion and a lower portion, the upper portion having a width greater than the lower portion, the slot forming edges on opposing sides thereof, the shield adapted to receive an onion within the open lower end thereof, the shield serving to protect a user's eyes from juices produced when slicing the onion;

a rubber strip secured to the edges of the slot of the shield, the rubber strip adapted to secure a knife blade within the slot to be used on an onion within the shield;

a knife having a blade portion adapted to be received within the slot and the rubber strip of the shield, the knife functioning to slice the onion.

2. An onion peeling device for enabling a user to effectively peel and slice an onion without disturbance to his/her eyes comprising, in combination:

a shield having an open lower end and a rounded upper end, the open lower end having a slot formed therein extending upwardly therefrom, the slot having an upper portion and a lower portion, the upper portion having a width greater than the lower portion, the slot forming edges on opposing sides thereof, the shield adapted to receive an onion within the open lower end thereof, the shield serving to protect a user's eyes from juices produced when slicing the onion;

a rubber strip secured to the edges of the slot of the shield, the rubber strip adapted to secure a knife blade within the slot to be used on an onion within the shield.

3. The device as described in claim 2 and further including a knife having a blade portion adapted to be received within the slot and the rubber strip of the shield, the knife functioning to slice the onion.

4. The device as described in claim 3 and further including wherein the open lower end of the shield having a first peripheral portion and a second peripheral portion, the first peripheral portion situated above the second peripheral portion, the first peripheral portion separated from the second peripheral portion by a vertical step portion, the vertical step portion having an upper end and a lower end, the upper end integral with the first peripheral portion, the lower end integral with the second peripheral portion, the slot of the shield extending upwardly from the vertical step portion.

* * * * *